Patented Apr. 2, 1946

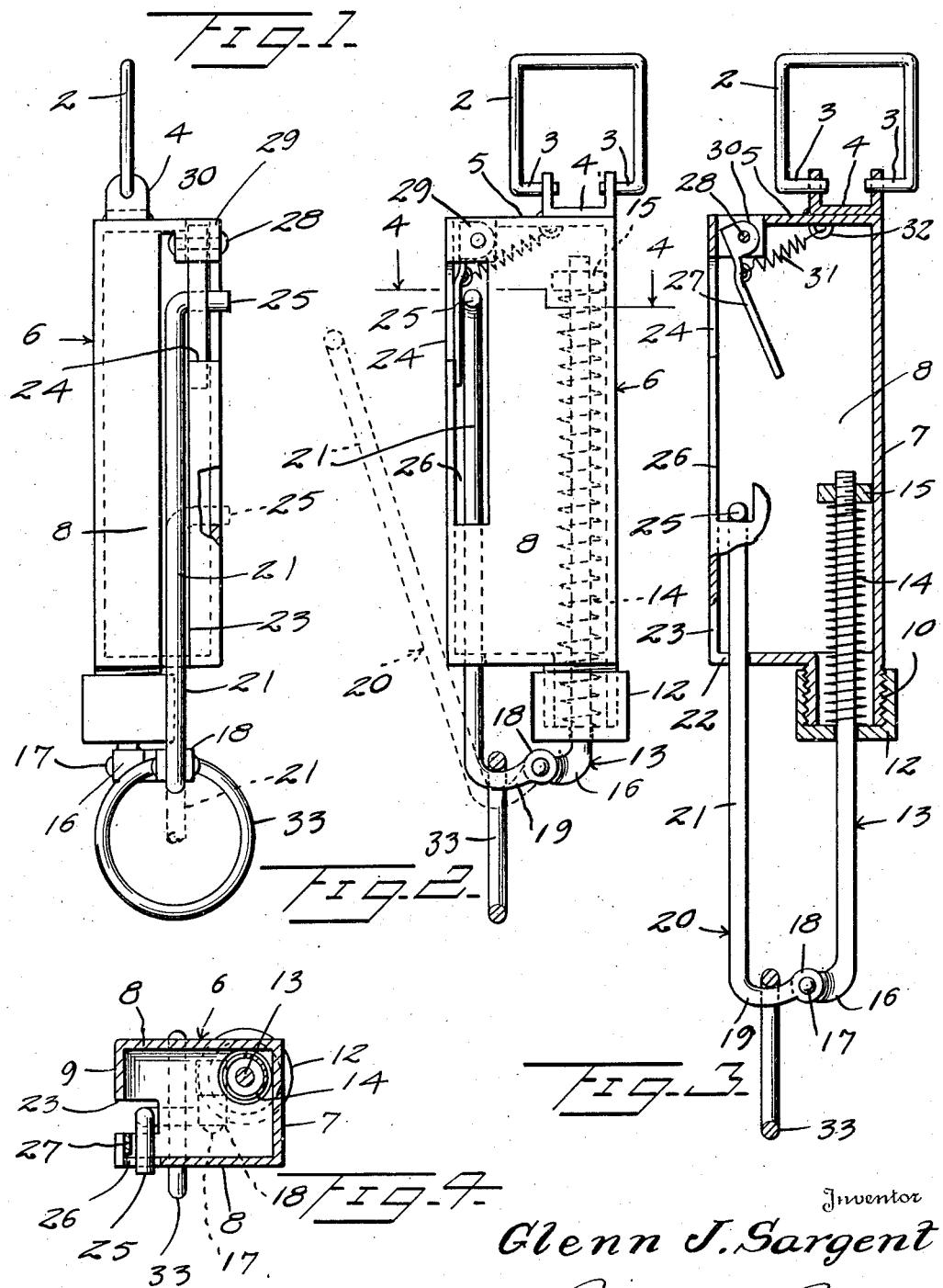

2,397,694

UNITED STATES PATENT OFFICE 2,397,694

CONNECTION DEVICE

Glenn J. Sargent, Edgar Springs, Mo.

Application August 10, 1945, Serial No. 610,044

6 Claims. (Cl. 294—83)

This present invention relates to an automatic release coupling, and has for an object to provide a coupling from which a cargo or other load may be safely suspended until it has been lowered upon a supporting surface such as the ground, whereupon the load will be automatically released from the coupling.

One particular use of an invention of this nature is as a coupling means between a parachute and a cargo supported and being lowered thereby. In such uses it is extremely desirable that the load be safely secured to the parachute, yet once the load has landed on its supporting surface, it is extremely desirable that the parachute be automatically detached from the load so that the same will not be dragged sideways and be damaged, particularly in high winds.

With the foregoing and other objects in view, the invention consists in the construction, combination and arrangement of parts hereinafter described and illustrated in the drawing, in which:

Figure 1 is a front view of the preferred embodiment of my invention, in unloaded condition;

Figure 2 is a side view in the same condition, the dotted line showing the lever in released position;

Figure 3 is a side view in loaded condition;

Figure 4 is a transverse section on line 4—4 of Figure 2.

In the drawing in which like characters of reference designate like or similar parts, numeral 2 denotes a rectangular split ring preferably of metal the horizontal aligned end portions 3 of which are inserted in registering openings formed in the free ends of the legs of a U-shaped yoke 4. The same is attached by welding or otherwise to the upper surface of the top 5 of a substantially rectangular housing or frame 6 which also includes a back wall 7, side walls 8 and front wall 9. The bottom of the housing consists of a flat portion 10 and a cylindrical downwardly extending part 11 which is exteriorly threaded into a cap 12. The latter includes a bottom with a central aperture in which a slide rod 13 is slidably disposed. The portion of the rod extending above the bottom of the cap is encircled by a coil spring 14 the lower end of which bears against the bottom of the cap and the upper end of which engages a nut 15 threaded upon the upper end of the rod and therefore tends to support the rod in the raised position of Figures 1, 2. The lower end 16 of the rod is bent horizontally and forwardly and has a horizontal aperture for a pin 17 which is also inserted in registering apertures formed in the boss 18 of the substantially horizontal and rearwardly extending lower portion 19 of a lever 20. The remaining part 21 of the latter extends at right angles to the portion 19 and vertically through a slot 22 formed in the forward part of the bottom section 10. A slot 23 in the front wall is in communication at its lower end with the forward end of slot 22 and of such width and length as to permit the lever to swing out of the housing on the pin 17 to the dotted line position of Figure 2 under conditions still to be described. The upper portion 24 of the slot 23 is wider than the lower portion and extends to the outer face of the right-hand (Figure 1) side wall 8 of the housing. This widened slot portion provides a gate for the top end 25 of the lever which extends horizontally and towards the right (Figure 1) and terminates beyond the outer face of the right-hand sidewall of the housing.

Since the horizontal top end 25 of the lever is of the length described, a slot 26 communicating with slot portion 24 and providing a path for such end is formed in the right-hand (Figure 1) side wall of the housing (Figure 2). It is apparent that the lever can only be swung outwardly when its upper horizontal end is in the upper portion of slot 26 which communicates with the slot structure in the front wall.

The slot portion or opening 24 is normally blocked for the outward motion of the lever by a trigger 27 which is pivoted upon a pin 28 lodged in registering openings, one formed in the fragment 29 of the right-hand side wall of the housing overhanging the slot 26 and the other one formed in a lug 30 depending from the top wall and spaced from the fragment. The trigger is sufficiently long to extend beneath the lower horizontal edge of opening 24, thus blocking the outward motion of the lever. The trigger is urged to non-blocking or retracted position (Figure 3) by a spring 31 attached with its lower end to the trigger and secured at its upper end to a staple 32 depending from the top wall of the housing. Numeral 33 is a ring interlinked with the prospective load or cargo of a parachute (not shown) and the substantially horizontal slightly depressed portion of the lever.

In order to establish an interlinking relation between the ring and the lever, the slide rod and lever are retracted downwardly from the position of Figure 2 to a position in which the upper horizontal end of the lever clears the lower edge of the trigger (Figure 3). The same had heretofore been held in a depending vertical position (Figure 2) by the upper end portion of the lever which is restrained from pivoting inwardly about the pin 17 between the lever and slide rod by the engagement of the horizontal lever part in the slot 26. With the lever depressed to a position in which its horizontal upper part is beneath the lower edge of the trigger, the latter is swung by its spring to the position of Figure 3. If now the downward pull on the lever and slide rod ceases these two elements will rise under the pressure of the other spring 14 to a position in which the horizontal upper part of the lever lies above the lower edge of slot portion 24 and in which therefore the lever can be swung outwardly to the dotted line position of Figure 1 and beyond to a position inclined from the pivot pin. During the outward motion of the lever the ring has been sliding to the left of its position in Figure 2.

Modifications and changes in the number and arrangements of the parts may be made by those skilled in the art without departing from the nature of the invention, within the scope of what is hereinafter claimed.

What I claim and desire to secure by Letters Patent is:

1. An automatic load releasing coupling comprising a frame including means for suspending the same from a support and front and side walls, a hook slidably disposed in the frame and including a front part and rear part pivoted together at their lower ends outside the frame, spring means for urging the hook to retracted position within the frame, a ring adapted to be interlinked with the front part of the hook, a slot in the front wall of the frame permitting the front part of the hook to swing outwardly of the frame, a latch normally held in retracted position in the frame and also adapted to obstruct a portion of the front wall slot whereby to block the outward swinging of the front part.

2. An automatic load releasing coupling comprising a ring adapted for being interlinked with a parachute, a frame attached to the ring and including front and side walls, a hook slidably disposed in the frame and resiliently urged to retracted position within the housing and including a front and rear part pivoted together at their lower ends outside the frame, a second ring adapted to be interlinked with the front part of the hook and a load, a slot in the front wall of the frame permitting the front part of the hook to swing outside the frame, a latch normally held in retracted position in the frame and also adapted to obstruct a part of the front wall slot whereby to block the outward swinging of the front part of the hook.

3. An automatic load releasing coupling comprising a frame including means for suspending the same from a support and slotted front and side walls, a hook slidably disposed in the frame and including a front part and rear part pivoted together at the lower ends outside the frame, the front part being swingable through the slot in the front wall and guided by the slot in the side wall, spring means for urging the hook to retracted position within the frame, a ring for connecting the front part of the hook to a load, a latch normally held in retracted position in the frame and also adapted to obstruct a portion of the front wall slot whereby to block the outward swinging of the front part.

4. An automatic load releasing coupling comprising a frame including means for suspending the same from a support and slotted front and side walls, a rod slidably disposed in the frame and resiliently urged to a position within the latter with the lower rod end outside of the frame, a lever pivoted at its lower end to the lower rod end and swingable through the front wall slot and including means guided in the side wall slot during the outward movement of the rod and lever, a latch pivoted to the frame and adapted to obstruct the front wall opening whereby to block the outward swing of the lever, a latch spring for urging the latch to non-obstructing position in which the lever may swing through the front wall slot.

5. An automatic load releasing coupling comprising a frame including means for suspending the same from a support and slotted front and side walls, and a bottom with two apertures, a rod slidably disposed in the frame and one of the apertures thereof and resiliently urged to a position within the frame with the lower rod end outside the same, a lever pivoted at its lower end to the lower rod end and swingable through the front wall slot including means guided in the side wall slot during the outward movement of the rod and lever, a latch pivoted to the frame and adapted to obstruct the front wall slot whereby to block the outward swing of the lever, a latch spring for urging the latch to non-obstructing position in which the lever may slide through the front wall slot.

6. An automatic load releasing coupling comprising a frame including means for suspending the same from a support and front, side and bottom walls, slots formed in the front and one of the sidewalls and communicating with one another, a hook lever having an upper horizontal end slidable in the slot in the sidewall, a rod slidable in the bottom wall of the frame and normally resiliently held in a position in which only its lower end extends below the frame and pivoted at such end to the lower end of the hook lever, a latch pivoted in the frame and adapted to close the portion of the front wall slot communicating with the side wall slot to thereby block the lever from swinging outwardly through the front wall slot, and a spring retracting the latch from closing position.

GLENN J. SARGENT.